US011755928B1

(12) United States Patent
Blackburn et al.

(10) Patent No.: US 11,755,928 B1
(45) Date of Patent: Sep. 12, 2023

(54) COMPUTING CLUSTER CONFIGURATION STANDARDIZATION

(71) Applicant: Wells Fargo Bank, N.A., San Francisco, CA (US)

(72) Inventors: Justin Christopher Blackburn, Gallatin Gateway, MT (US); Jeremy Daniel Blackburn, Tempe, AZ (US); Jacob Tyler Blackburn, Phoenix, AZ (US); William H. Beatty, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 387 days.

(21) Appl. No.: 16/859,317

(22) Filed: Apr. 27, 2020

(51) Int. Cl.
*G06N 5/025* (2023.01)
*H04L 41/0823* (2022.01)
*G06F 9/50* (2006.01)

(52) U.S. Cl.
CPC ............ *G06N 5/025* (2013.01); *G06F 9/5072* (2013.01); *G06F 9/5077* (2013.01); *H04L 41/0823* (2013.01)

(58) Field of Classification Search
CPC ................ H04L 41/08; G06F 8/60; G06F 8/70
See application file for complete search history.

(56) References Cited

U.S. PATENT DOCUMENTS

| | | | |
|---|---|---|---|
| 7,877,644 B2 | 1/2011 | Stenzel | |
| 8,924,539 B2 | 12/2014 | Ferris et al. | |
| 8,972,578 B2 | 3/2015 | Mitchell et al. | |
| 9,166,890 B2 | 10/2015 | Maytal et al. | |
| 9,379,944 B2 | 6/2016 | Kinoshita et al. | |
| 9,563,463 B2 | 2/2017 | Innan et al. | |
| 9,792,339 B2 | 10/2017 | Jayapal et al. | |
| 9,813,318 B2 | 11/2017 | Iyoob et al. | |
| 10,055,257 B2 | 8/2018 | Birkestrand et al. | |
| 11,481,648 B2 * | 10/2022 | Alexander | G06N 5/04 |

(Continued)

FOREIGN PATENT DOCUMENTS

WO   WO-2017082939 A1   5/2017

OTHER PUBLICATIONS

Bhattacharya, Adrija, et al., "Service Provisioning in Cloud—A Systematic Survey", Advanced Computing and Systems for Security. Advances in Intelligent Systems and Computing, vol. 568, (2017), 37-63.

*Primary Examiner* — Nicholas P Celani
(74) *Attorney, Agent, or Firm* — SCHWEGMAN LUNDBERG & WOESSNER, P.A.

(57) ABSTRACT

Systems and techniques for computing cluster configuration standardization are described herein. Configuration data obtained for a plurality of computing systems may be evaluated. A first computing cluster may be identified based on first configuration data for a first set of computing systems. A second computing cluster may be identified based on second configuration data for a second set of computing systems. A score may be calculated for the second computing cluster based on an evaluation of the second configuration data using the first configuration data. The second computing cluster may be associated with the first computing cluster based on the score. A standard configuration may be selected to be applied to the first set of computing systems and the second set of computing systems using the first configuration data.

21 Claims, 6 Drawing Sheets

(56) References Cited

U.S. PATENT DOCUMENTS

| | | | |
|---|---|---|---|
| 2004/0181790 A1* | 9/2004 | Herrick | G06F 8/60 |
| | | | 717/174 |
| 2007/0192322 A1* | 8/2007 | Dandekar | G06F 9/4451 |
| | | | 707/999.009 |
| 2015/0019195 A1 | 1/2015 | Davis | |
| 2015/0113001 A1* | 4/2015 | Prieto | H04L 41/0856 |
| | | | 707/748 |
| 2018/0052729 A1 | 2/2018 | Ozaki | |
| 2020/0304571 A1* | 9/2020 | Ranjan | H04L 67/1097 |

* cited by examiner

COMPUTING CLUSTER CONFIGURATION STANDARDIZATION

TECHNICAL FIELD

Embodiments described herein generally relate to computing system configuration standardization and, in some embodiments, more specifically to computing cluster configuration standardization.

BACKGROUND

An enterprise computing infrastructure may include many computing devices (e.g., hundreds, thousands, etc.). The infrastructure may have a variety of software applications executing on the computing devices that provide a variety of functions. The computing systems may be organized into clusters that provide redundancy and increased computing capacity for an application or application component operating on the network. The enterprise may have multiple computing environments (e.g., production, test, development, etc.) that may each include a similar computing cluster that provides similar functionality.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An enterprise may wish to migrate from a computing environment built of physical, individual servers to a cloud infrastructure that provides flexible processing and storage capacities across a number of computing nodes. Prior to a migration to a cloud infrastructure, an assessment of an application's infrastructure is undertaken to determine the components that will be migrated to the cloud. Refactoring applications to work in a cloud environment may be a challenge in moving an existing application from a legacy physical server environment to a cloud-based environment. Refactoring refers to making changes to applications running in the environment to achieve compatibility with a destination computing environment. Refactoring may include changing application code, configuration settings, etc. In some cases, cloud migrations may not be cost effective or some applications may not make a migration to the cloud due for technical reasons. Standardization within an application itself may provide streamlined operations regardless of whether applications are migrated to the cloud or continue to operate in a legacy environment. Cloud environments are not the only place where development operations (DevOps) may take place. A full understanding of the applications executing in a computing infrastructure through standards identification and application may be used to achieve automated code promotion and deployment in a cloud-based or legacy environment. The systems and techniques discussed herein provide a pre-cloud migration tool as well as a tool to standardize applications that remain behind in a legacy environment. Standardization of cluster member computing systems and the clusters across the various environments may reduce complexity resulting in a more secure and cost effective computing infrastructure.

Applications may not exist within a single environment (e.g., production) where end users interact with the environment. Applications may be executing in several environments within the enterprise infrastructure (four environments or more, etc.). These environments may include a development environment (DEV), a user acceptance testing environment (UAT), a production environment where customers interact with the application (PROD), and a failover backup environment in case the application experiences an outage such as a business continuity plan (BCP) environment, hot site, etc.

Drift refers to the tendency over time for configurations of environments to change, whether through the original build itself being conducted differently, problems, troubleshooting, errors, deployments, break-fix, patching, etc. The software life cycle of a server or application may exceed five years which provides a long period of time for the four environments to slowly diverge from each other. Even servers within the same environment may slowly diverge. These divergences may cause applications to behave differently in different environments causing automated deployments to behave differently which may cause operational costs to increase.

The systems and techniques discussed herein collect configuration data and correlate servers, clusters (e.g., DEV, UAT, PROD, and BCP), and configuration items at a deep detailed level across the environments. A standardization score may be individually applied to applications at a granular level to identify similarly configured application components throughout the enterprise computing infrastructure.

The details of configuration items from individual clusters are extracted at each layer of an application and clusters and cluster members are identified. In an example, clusters for an application may consist of more than a web server, an application server, a database server or of groupings of servers of those components, but rather the sum of the tiers of those servers stacked together with the accompanying load balancers to share traffic between them, the servers themselves, and the shared filesystems and data stores located on the servers. The components represent a massive moving target that experiences the potential for drift and are identified and associated so that a standard may be applied to the components throughout the clusters to prevent drift. A data collector (e.g., scanning agent, installed software agent, agentless data collector, etc.) may extract configuration data from the computing systems operating throughout the enterprise infrastructure. The configuration data may provide the input used to identify clusters and cluster members for various application components.

Relationships between components are established to determine servers and clusters that should be configured similarly. Clusters may exist when they contain like components. For example, two web servers of a cluster should be configured identically allowing for minor differences. For example, both web servers may respond to devenvironment.com, but may have different hostnames (e.g., devweb0001 and devweba0001, etc.) and different internet protocol (IP) addresses (e.g., 192.168.1.20 and 192.168.1.21). Ideally their application (e.g., APACHE® webserver) configuration would be identical so when the data extraction for the hosts is completed, they would be able to be easily matched based on a configuration items (e.g., httpd.conf) between the two being 100% matching. However, each of the computing environments may have web servers in clusters. For example, each environment may have two web servers (e.g., eight web servers split into four clusters). Each web server therefore should have an identical configuration score to the other web server in its cluster and may be scored close (e.g., a 99% score, etc.) with the other three clusters with configuration differences between the environments accounting for the difference (e.g., 1%, etc.).

However, this may not be the case given possible configuration drift. Over time, the two DEV servers may have hand edited configuration files and they may be 95% the same and they may only 85% resemble one other cluster and 78% resemble production. If this is repeated for the multitude of servers across the enterprise computing environment, the drift problem may only be rectified through an automated standardization and mitigation process. The systems and techniques discussed herein provides evaluation of complex configurations to identify cluster members and identify peer clusters across the computing environments.

Each server configuration is scored to others within its cluster and to the other servers within its peer clusters for that application. This scoring mechanism may become a key performance indicator (KPI) for cloud migrations and for DevOps itself. DevOps may rely on a standardized platform for code deployment. Standardization also allows developers to deploy code rapidly through their environments with little intervention so they can speed their applications to market.

The KPI may be used as a KPI for legacy applications without having to refactor the entire infrastructure and move to a new environment. This provides a solution for the existing environment that allows legacy environments to remain functional and allows automation and DevOps to stack on top of them allowing a more methodical move to new technologies (e.g., Kubernetes, Cloud Foundry. Docker, etc.) and a longer software life cycle of the existing infrastructure. This may allow traditional three-tiered architecture to remain viable longer and may be used prior to a cloud migration for applications months in advance by preparing them and standardizing their application before cloud refactoring.

Conventional techniques for cloud migration may use cloud native (e.g., not backward compatible, legacy compatible, etc.) technologies for the new technology. This does not address traditional platforms and applications running on the standard three-tier application infrastructure on physical and/or virtual machine hardware that is still commonplace. The conventional approaches focus on the idea that the platforms companies use are already standardized which ignores that environments have pockets of deeply non-standard, legacy, archaic infrastructure. For example, a legacy application may be managed by siloed groups that remain from a merger or acquisition that has not been integrated and assimilated into the standardization of the parent computing infrastructure. The systems and techniques discussed herein allow the enterprise computing infrastructure to move toward cross environment standardization.

Figure 1:
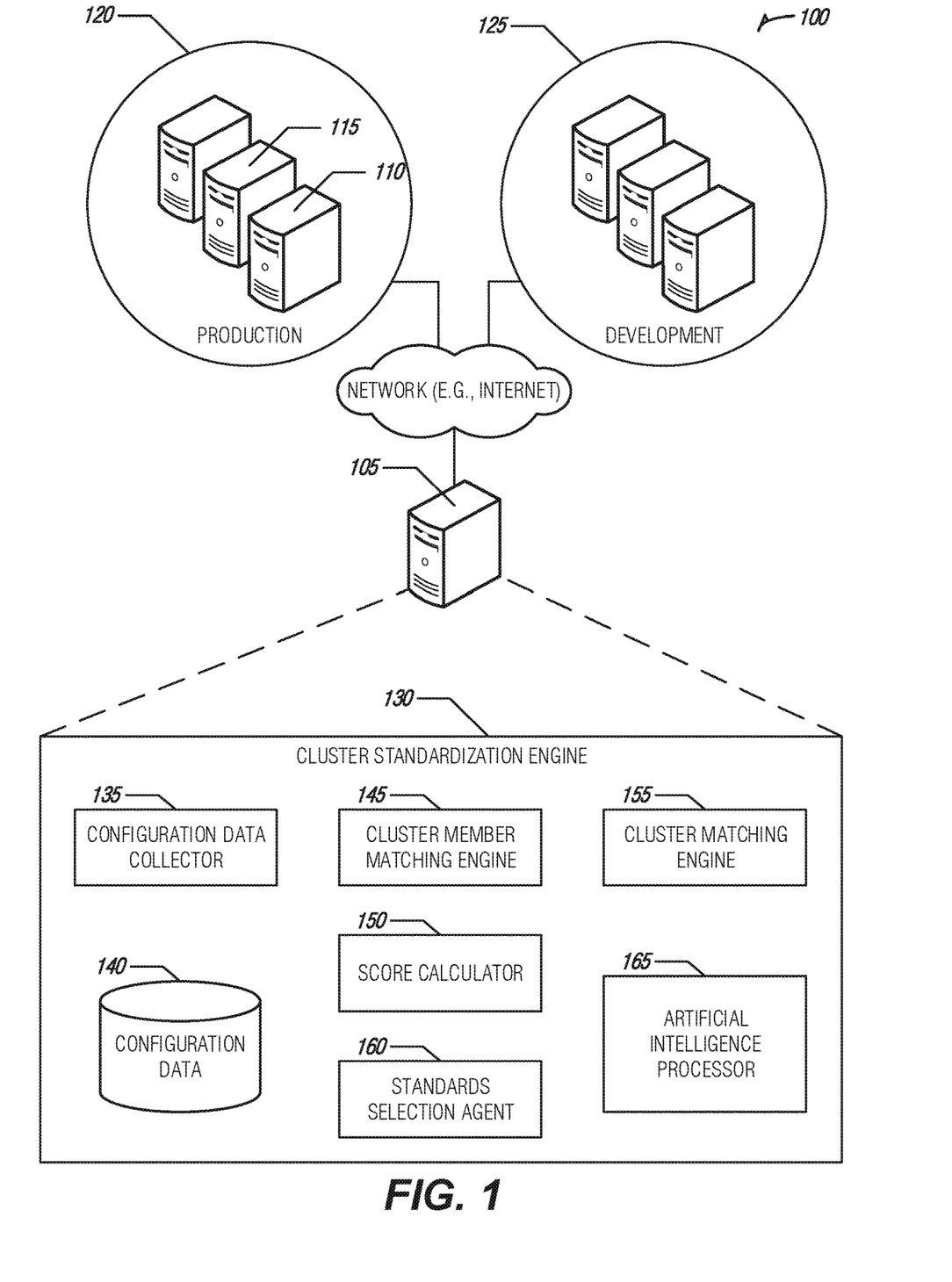
FIG. 1 is a block diagram of an example of an environment and a system for computing cluster configuration standardization, according to an embodiment.

FIG. 1 is a block diagram of an example of an environment 100 and a system 130 for computing cluster configuration standardization, according to an embodiment. The environment 100 may include one or more standardization servers 105 (e.g., a standalone server, a cluster of computing systems, a cloud service, etc.), a first computing system 110, and a second computing system 115. The first computing system 110 and the second computing system 115 may be members of a first computing cluster 120 (e.g., production, etc.) along with other computing systems. The environment 100 may include a second computing cluster 125 (e.g., development, etc.) that may include member computing systems.

The standardization server 105 may include the system 130. In an example, the system 130 may be a cluster standardization engine. The system 130 may include a variety of components that include a configuration collector 135, a configuration database 140, a cluster member matching engine 145, a score calculator 150, a cluster matching engine 155, a standards selection agent 160, and an artificial intelligence processor 165.

Figure 6:
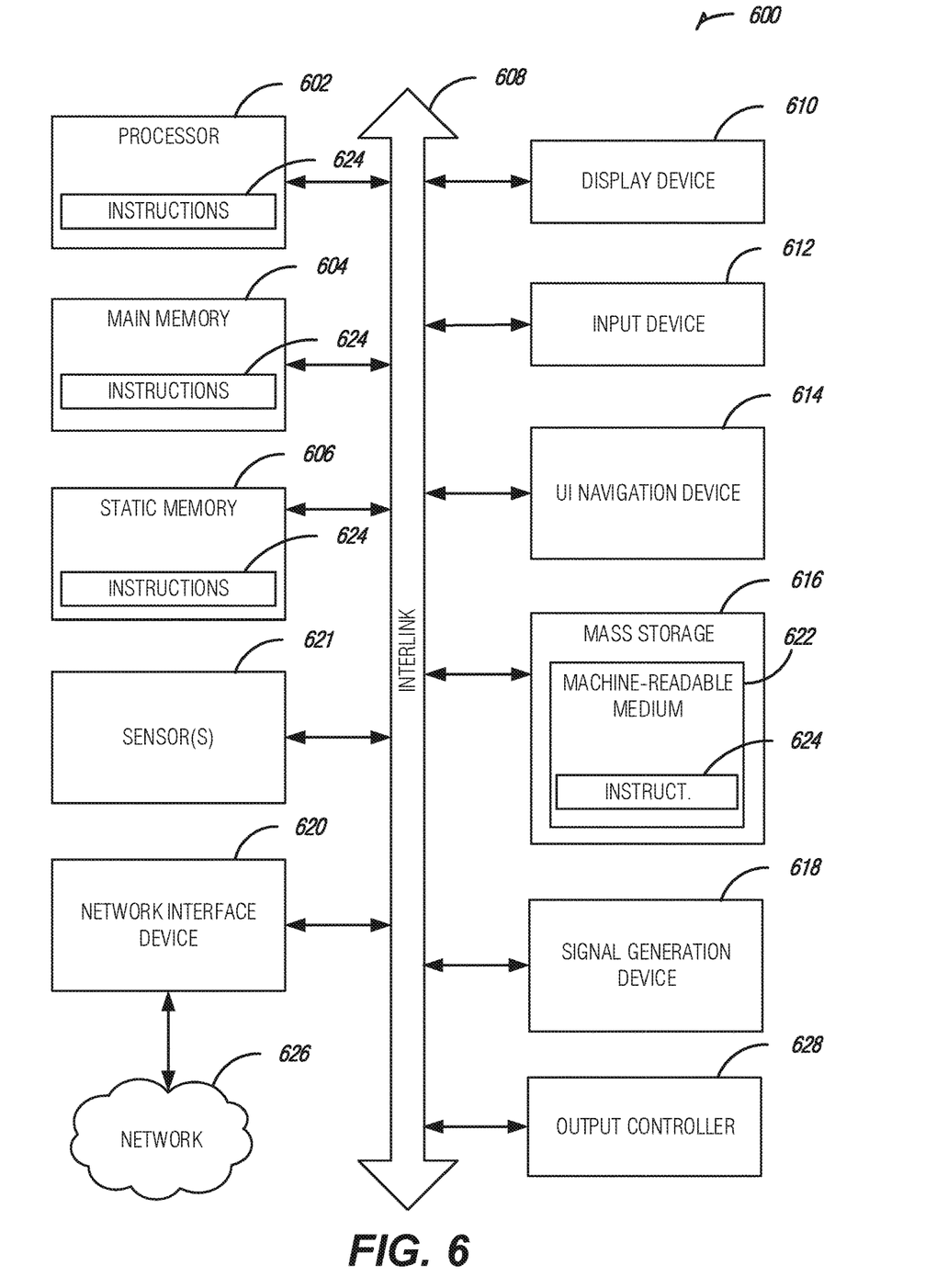
FIG. 6 is a block diagram illustrating an example of a machine upon which one or more embodiments may be implemented.

The configuration collector 135, the configuration database 140, the cluster member matching engine 145, the score calculator 150, the cluster matching engine 155, the standards selection agent 160, and the artificial intelligence processor 165 may comprise one or more processors (e.g., hardware processor 602 described in FIG. 6, etc.) that execute software instructions, such as those used to define a software or computer program, stored in a computer-readable storage medium such as a memory device (e.g., a main memory 604 and a static memory 606 as described in FIG. 6, a Flash memory, random access memory (RAM), or any other type of volatile or non-volatile memory that stores instructions), or a storage device (e.g., a disk drive, or an optical drive). Alternatively, the configuration collector 135, the configuration database 140, the cluster member matching engine 145, the score calculator 150, the cluster matching engine 155, the standards selection agent 160, and the artificial intelligence processor 165 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

The configuration collector 135 may collect configuration data from the first computing system 110, the second computing system 115, and other computing systems in an enterprise computing environment. The configuration collector may store configuration data in the configuration database 140 or may obtain configuration data from the configuration database 140. The configuration collector 135 may obtain configuration data from computing systems for example, by scanning the computing systems for configuration information, using a software agent installed on the computing systems, using agentless data collection techniques, etc. In an example, the configuration collector 135 may scan a plurality of computing systems to obtain respective configuration data for each computing system of the plurality of computing systems. The configuration data may include identification of components executing on each computing system and configuration variables for each of the components executing on each of the computing systems. For example, a filename and version of an executable for an application may be included in the configuration data along with the name of a configuration file associated with the application and values for variables included in the configuration file.

The cluster member matching engine 145 may identify the first computing cluster 120 based on first configuration data for the first computing system 110. In an example, configuration data may be obtained for the first computing system 110 of the first set of computing systems. The score calculator 150 may generate a score for the second computing system 115 of the plurality of computing systems based on an evaluation of configuration variables for components executing on the second computing system 115 against configuration variables for components executing on the first computing system 110. In an example, the score may be a probability calculated by a model produced by training the artificial intelligence processor 165 that indicates a probability that the configuration of the second computing device 115 matches the configuration of the first computing device 110. The second computing system 115 may be added to the first set of computing systems based on the score. For example, the cluster member matching engine may use a threshold to identify a cluster member. For example, the threshold may indicate that computing systems with configuration match probabilities above 99% should be identified as cluster members.

For example, the first computing system 110 may be a cluster member of a production cluster that provides a web application function on the production network. The configuration data of the second computing system 115 may be compared to the configuration data of the first computing system 110 to generate a score indicating a 99% probability that the configuration of second computing system 115 matches the configuration of the first computing system 110 and the second computing system 115 may be added to a web application cluster including the first computing system 110. The cluster may be associated with an environment in which it is executing based on shared identity information (e.g., IP network address, serviced uniform resource locator (URL), domain name, etc.)

In an example, the artificial intelligence processor 165 may be trained using training configuration data to generate a configuration matching model, wherein the configuration matching model includes matching rules for applications corresponding to components executing on the plurality of computing systems. The matching rules may include weights for configuration variables for each of the components. For example, an executable file name may be assigned a weight of 1 indicating that the filename should be given full weight when determining a match probability while a hostname may be given a weight of 0.2 indicating that the hostname should be given less (e.g., 20% weight, etc.) when calculating match probability. The artificial intelligence processor 165 may be a physical processor, software instructions executed by a hardware processor, software circuit set, a combination of hardware and software, etc. that includes processing logic to perform artificial intelligence operations such as generating and artificial intelligence models and generating output based on evaluation of input data using the artificial intelligence model.

The artificial intelligence processor 165 may use a variety of artificial intelligence techniques including for example, machine learning, neural networks, classifiers, support-vector machines, etc. to process the training data and create a corresponding model for evaluating configuration data input. For example, a neural network may be trained that includes a variety of layers for calculating a probability that second configuration data inputs match first configuration data inputs. For example, filenames, hostnames, configuration files, configuration variables, etc. may be evaluated in the two set of configuration data to generate a probability or other score that indicates how likely computing systems corresponding to the configuration data are to be similarly configured. The similarity of configuration may then be used to determine if the computing systems are members of a computing cluster. For example, the first computing system 110 and the second computing system 115 may be determined to be members of the first computing cluster 120 based on a 99% probability that they are configured to provide the same function as the cluster.

The first computing cluster 120 and the second computing cluster 125 may be evaluated to determine if they provide the same functionality to their respective environments. For example, the first computing cluster 120 may provide a web application function to a production network and the second computing cluster may provide the web application function for a development environment. The evaluation may be conducted using configuration data of respective computing systems in the respective cluster. The cluster matching engine 155 may identify the second computing cluster 125 based on second configuration data for a second set of computing systems (e.g., a normalized set of configuration data for the second set of computing devices including shared configuration data elements, etc.).

The score calculator 150 may calculate a score for the second computing cluster 125 based on an evaluation of the second configuration data using first configuration data for the first computing cluster 120. The score calculator 150 may work in conjunction with the artificial intelligence processor 165 to evaluate the configuration data to determine a probability that the functions provided by computing systems in the second computing cluster 125 provide the same function as computing systems in the first computing cluster 120.

The evaluation may use weights, filters, etc. to adjust the probability to account for necessary configuration differences between environments in which the clusters are executing. For example, IP address and hostname may be given little weight or may not be evaluated in calculating the probability. In an example, thresholds may be used to account for configuration differences between environments. For example, a model generated by the artificial intelligence processor 165 may indicate that a variance between training clusters in a first and second cluster is 15% that are peers and >15% in clusters that that are not peers. The score calculator 150 may use a threshold of >85% probability of a match to identify peer clusters. Thus, variability of configuration between environments is allowed which maintain the ability to identify clusters performing similar functions across the enterprise computing infrastructure.

In an example, the second configuration and the first configuration data may be received as input to the artificial intelligence processor 165 and the second configuration data and the first configuration data may be evaluated using the configuration matching model to calculate the score by the score calculator 150. The score may be based in part on the components identified in the second configuration data and weights for the configuration variables for the identified components.

The cluster matching engine 155 may associate the second computing cluster 125 with the first computing cluster 120 based on the score. For example, a record may be added to the configuration database 140 indicating a cluster to which a computing system belongs and to which other clusters the cluster is related. The clusters and their respective members, now being associated, may be processed collectively to apply standards to bring the cluster members into homogeny. The standards selection agent 160 may select a standard configuration to be applied to the first set of computing systems and the second set of computing systems using the first configuration data. For example, the computing systems of the first computing cluster 120 and the second computing cluster 125 may be running a web server application that represents a presentation layer of a web-based application and a standard configuration may be identified from a standard configuration library based on an identity of the web application to apply standard configuration variable values to configuration of the computing systems.

In an example, an application executing on the first set of computing systems and the second set of computing systems may be identified based on first configuration data. A configuration standard may be selected by the standards selection agent 160 from a plurality of configuration standards based on the application, wherein the configuration standard includes configuration variable values for components of the application. In an example, the standard configuration may be applied to instances of the application executing on the first set of computing systems and the second set of computing systems by updating, for the components of the application, configuration variable values for respective computing systems of the first set of computing systems and the second set of computing systems. This allows the computing systems operating in the legacy environment to be brought to standard. In another example, the application of the standard may replace an application executing on the computing systems that is non-standard with a standard application while converting the configuration variables from variables for the non-standard application to variable of the standard application. In another example, the selected standard may be applied during a migration process for migrating the computing systems to another environment such as a cloud-based computing platform, etc.

Some configuration variables may be non-standard due to technical or other reasons and automatic application of a standard configuration may be problematic. Thus, exceptions may be identified and mitigated before application of a standard configuration. In an example, the standards selection agent 160 may determine that a configuration variable value for a configuration variable of a component of the application is uniform across the respective computing systems of the first set of computing systems and the second set of computing systems. The standards selection agent 160 may prevent application of a standard configuration variable value to the configuration variable of the component of the application and an exception notification may be transmitted to an administrator of the first set of computing systems and the second set of computing systems. They administrator may be asked to provide justification for the exception or to remediate the exception by correcting the exception or remediating the underlying cause of the non-standard configuration option.

Figure 2:
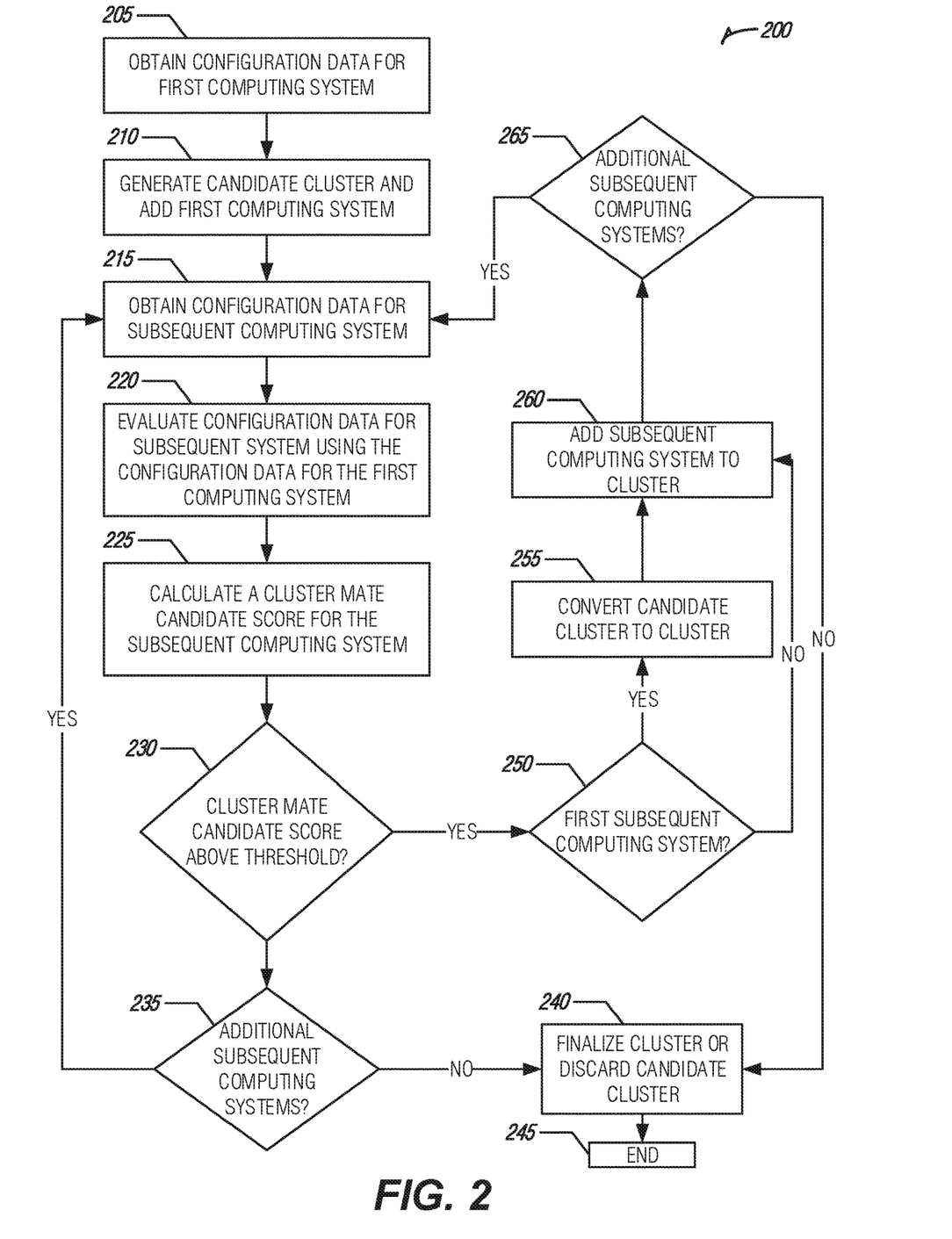
FIG. 2 illustrates a flow diagram of an example of a process for computing cluster member matching for computing cluster configuration standardization, according to an embodiment.

FIG. 2 illustrates a flow diagram of an example of a process 200 for computing cluster member matching for computing cluster configuration standardization, according to an embodiment. The process 200 may provide features as described in FIG. 1.

At operation 205, first configuration data may be obtained—such as by the configuration data collector 135 as described in FIG. 1, etc.—for a first computing system (e.g., first computing system 110 as described in FIG. 1, etc.). At operation 210, a candidate cluster may be generated—such as by the cluster member matching engine 145 as described in FIG. 1, etc.—and the first computing system may be added to the candidate cluster. This provides a temporary container for the cluster until it can be determined if the first computing system is a member of a cluster or is a standalone server, etc.

At operation 215, configuration data may be obtained—such as by the configuration data collector 135 as described in FIG. 1, etc.—for a subsequent computing system (e.g., the second computing system 115 as described in FIG. 1, etc.). At operation 220, the configuration data for the subsequent computing system may be evaluated—such as by the cluster member matching engine 145 in conjunction with the score calculator 150 and the artificial intelligence processor 165 as described in FIG. 1, etc.—using the configuration data for the first computing system. At operation 225, a cluster mate candidate score may be calculated—such as by the score calculator 150 as described in FIG. 1, etc.—for the subsequent computing system.

At decision 230, if it is determined—such as by the cluster member matching engine 145 as described in FIG. 1, etc.—that the cluster mate candidate score is above a threshold, then it is determined at decision 250 if the subsequent computing system is the first matched subsequent computing system. If so, the candidate cluster is converted to a cluster at operation 255 as it has been determined that a cluster exists and the subsequent computing system is added to the cluster at operation 260. At decision 250, if the computing system is not the first subsequent computing system to be matched, the subsequent computing system is added to the cluster at operation 260. At decision 265, it may be determined if other subsequent computing systems remain to be evaluated. If so, the next subsequent computing system configuration data is obtained at operation 215 and processed as described above until there are no remaining computing systems to process.

At decision 230, if the cluster mate candidate score is determined to be below the threshold, it is determined if there are additional subsequent computing systems to process at decision 235 and, if so, additional subsequent computing system configuration data is obtained at operation 215 and the process 200 continues.

When all of the subsequent computing systems have been processed—as determined at decision 235 or decision 265—the cluster is finalized if additional members of the cluster have been identified or discarded if no other cluster members have been identified at operation 240 and the process ends at operation 245.

Figure 3:
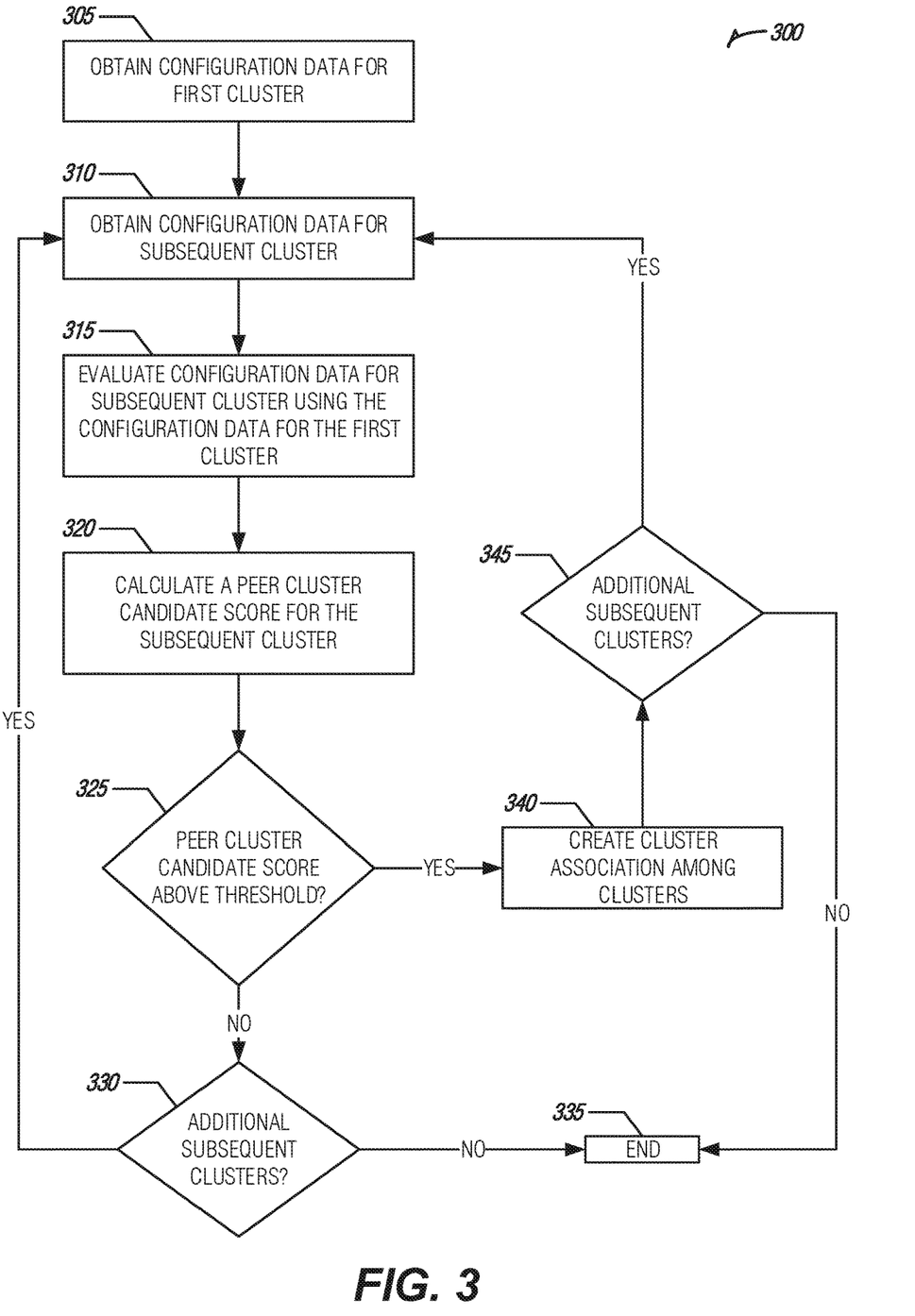
FIG. 3 illustrates a flow diagram of an example of a process for computing cluster matching for computing cluster configuration standardization, according to an embodiment.

FIG. 3 illustrates a flow diagram of an example of a process 300 for computing cluster matching for computing cluster configuration standardization, according to an embodiment. The process 300 may provide features as described in FIG. 1.

At operation 305, configuration data may be obtained—such as by the configuration data collector 135 as described in FIG. 1, etc—for a first cluster (e.g., first computing cluster 120 as described in FIG. 1, etc.). At operation 310, configuration data may be obtained—such as by the configuration data collector 135 as described in FIG. 1, etc.—for a subsequent cluster (e.g., second computing cluster 125 as described in FIG. 1, etc.).

At operation 315, the configuration data for the second cluster may be evaluated—such as by the cluster matching engine 155 in conjunction with the score calculator 150 and the artificial intelligence processor 165 as described in FIG. 1, etc.—using the configuration data for the first cluster. A peer cluster candidate score may be calculated—such as by the score calculator 150 in conjunction with the artificial intelligence processor 165 as described in FIG. 1, etc.—for the subsequent cluster.

At decision 325, it may be determined—such as by the cluster matching engine 155, etc.—if the peer cluster candidate score for the second cluster is above a threshold. If so, an association may be created—such as by the cluster matching engine 155 as described in FIG. 1, etc.—among the first cluster and subsequent clusters at operation 340. For example, by creating or updating records in a configuration database (e.g., configuration database 140 as described in FIG. 1, etc.). At decision 345, it may be determined if there are additional clusters to be evaluated. If so, additional subsequent cluster configuration data is obtained at operation 310 and the process 300 continues.

If it is determined that the peer cluster candidate score is below the threshold at decision 325, it is determined if there are additional clusters to be evaluated at operation 330. If so, additional subsequent cluster configuration data is obtained at operation 310 and the process 300 continues. When there are no additional clusters to be evaluated—as determined at decision 330 or decision 345—the process 300 ends at operation 335.

Figure 4:
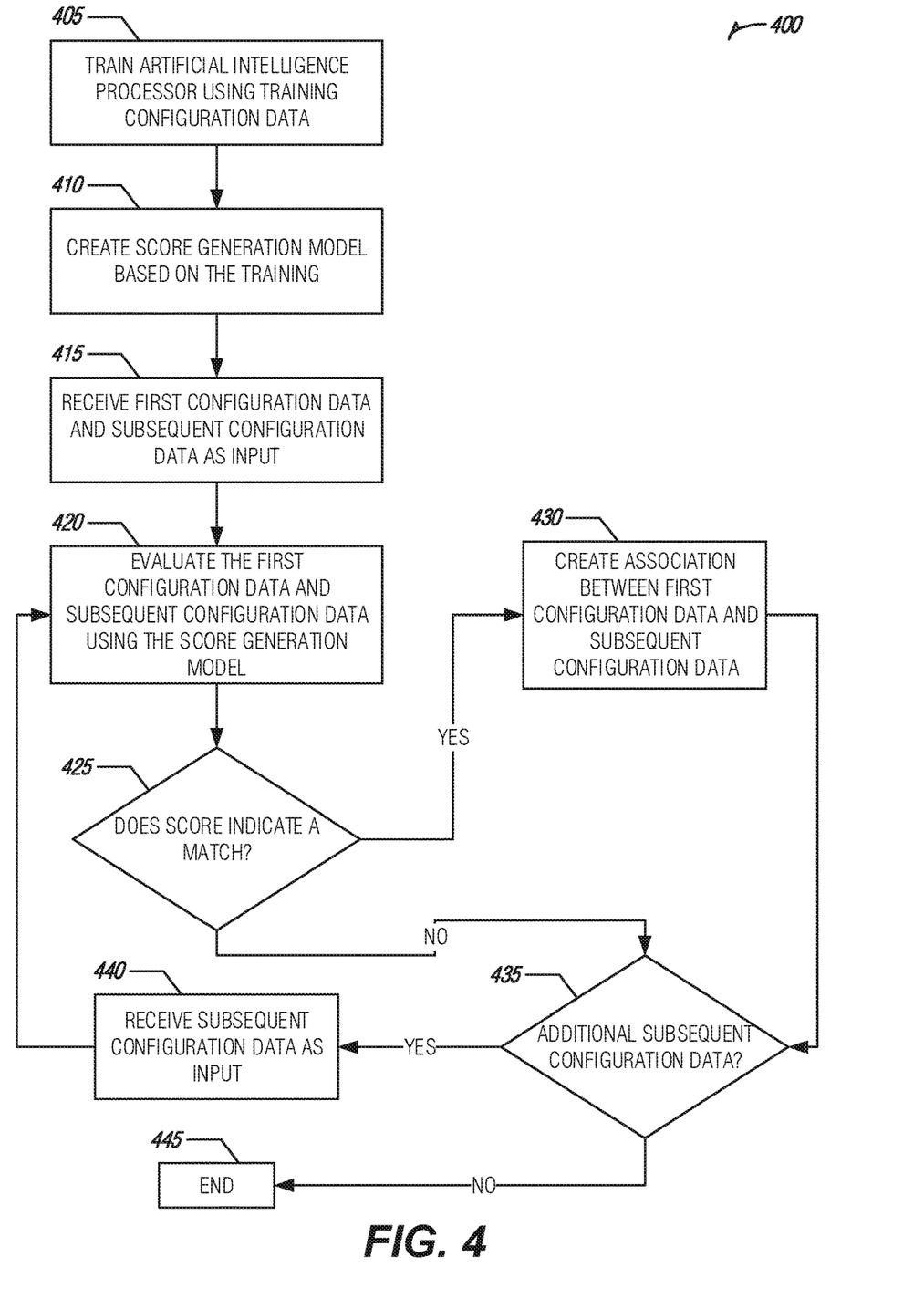
FIG. 4 illustrates a flow diagram of an example of a process for score generation for computing cluster configuration standardization, according to an embodiment.

FIG. 4 illustrates a flow diagram of an example of a process 400 for score generation for computing cluster configuration standardization, according to an embodiment. The process 400 may provide features as described in FIGS. 1 through 3.

At operation 405, an artificial intelligence processor—such as artificial intelligence processor 165 as described in FIG. 1, etc.—may be trained using training configuration data. The training configuration data may be labeled or unlabeled and may be evaluated to learn relationships between configuration items in the configuration data to generate a score generation model based on the training at operation 410 to evaluate configuration data outputs to calculate a probability that a first input set of configuration data matches a second set of input configuration data. The score generation model may use weights, filters, etc. to calculate a probability based on adjustments for importance of various configuration data elements in the configuration data. For example, IP address and hostname may have a small impact on the calculated probability because they may vary from computing system to computing system within various clusters while a data source name may have a larger impact on the calculated probability because the data source may be indicative of a function provided by a computing system or cluster.

At operation 415, first configuration data and subsequent configuration data may be received. For example, configuration data for a first member of a cluster and configuration data for a candidate member of a cluster may be received. In another example, representative configuration data may be received for a first cluster and a second candidate peer cluster. At operation 420, the first configuration data and the subsequent configuration data may be evaluated—such as by the score calculator 150 in conjunction with the artificial intelligence processor 165 as described in FIG. 1, etc.—using the score generation model. At decision 425, it may be determined—such as by the cluster member matching engine 145 as described in FIG. 1 and the cluster matching engine 155 as described in FIG. 1, etc.—if the score indicates a match. If so, an association may be created between the first configuration data and the second configuration data at operation 430. For example, the configuration database 140 may be updated to indicate that a first and second computing system are members of a cluster, to indicate that a first cluster is associated with a second cluster, etc.

If the score is determined not to indicate a match at decision 425 or upon creating the association at operation 430, it may be determined is there is addition subsequent configuration data to process at decision 435. If so, additional subsequent configuration data is received at operation 440 and the process 400 continues. When there is no remaining subsequent configuration data to process as determined at decision 435, the process 400 ends at operation 445.

Figure 5:
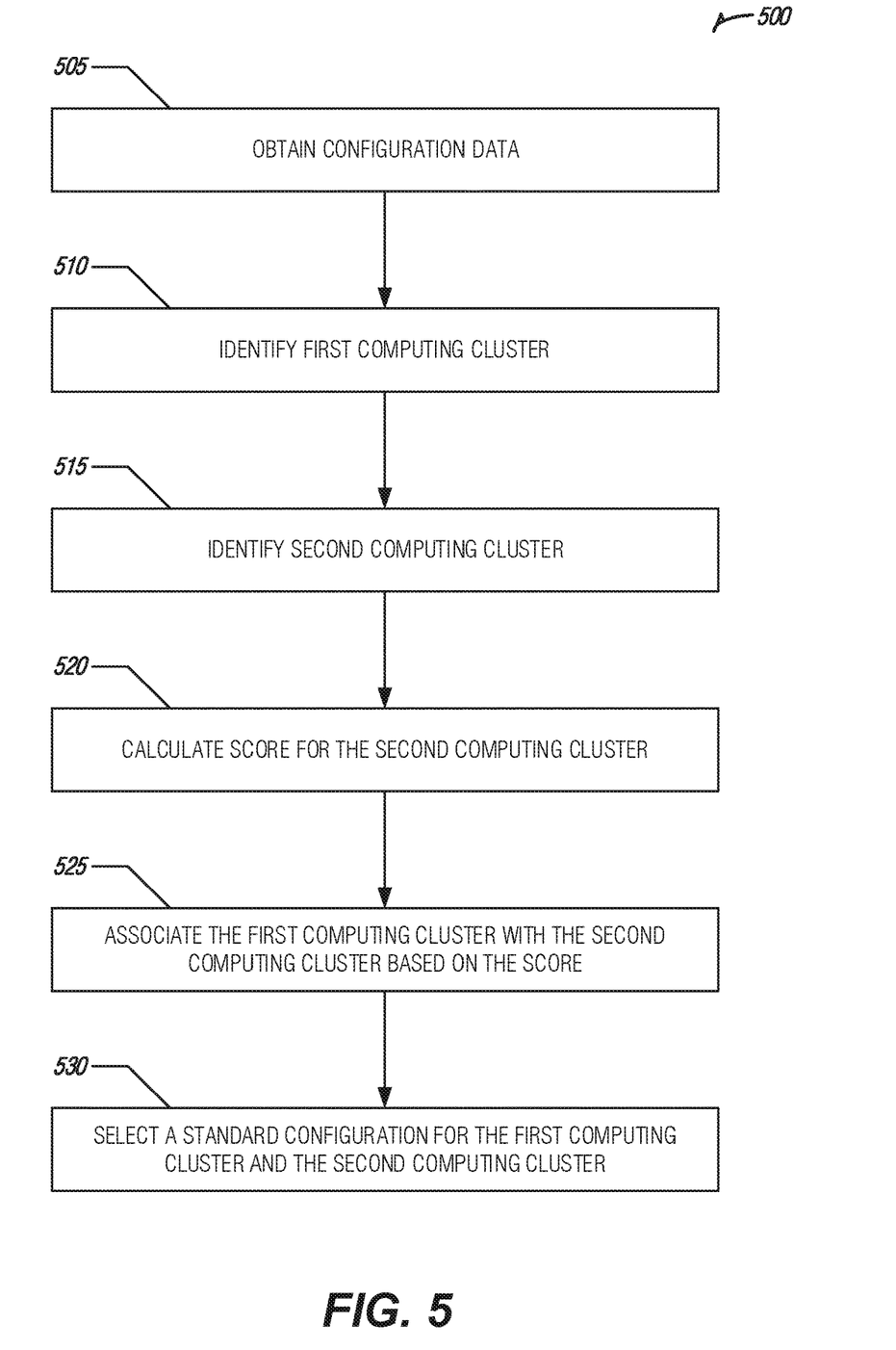
FIG. 5 illustrates an example of a method for computing cluster configuration standardization, according to an embodiment.

FIG. 5 illustrates an example of a method 500 for computing cluster configuration standardization, according to an embodiment. The method 500 may provide features as discussed in FIGS. 1 through 4.

At operation 505, configuration data may be obtained—such as by the configuration data collector 135 as described in FIG. 1, etc.—for a plurality of computing systems and may be evaluated—such as by the cluster member matching engine 145 as described in FIG. 1 and the cluster matching engine 155 as described in FIG. 1, etc. In an example, the plurality of computing systems may be scanned—such as by the configuration data collector 135 as described in FIG. 1, etc.—to obtain respective configuration data for each computing system of the plurality of computing systems. The configuration data may include identification of components executing on each computing system and configuration variables for each of the components executing on each of the computing systems.

At operation 510, a first computing cluster—such as the first computing cluster 120 as described in FIG. 1, etc.—may be identified—such as by the cluster member matching engine 145 as described in FIG. 1, etc.—based on an evaluation of first configuration data for a first set of computing systems form the configuration data—such as the first computing system 110 and the second computing system 115 as described in FIG. 1, etc. In an example, configuration data may be obtained for a first computing system of the first set of computing systems. A score may be calculated for a second computing system of the plurality of computing systems based on an evaluation of configuration variables for components executing on the second computing system against configuration variables for components executing on the first computing system and the second computing system may be added—such as by the cluster member matching engine 145 as described in FIG. 1, etc.—to the first set of computing systems based on the score.

At operation 515, a second computing cluster may be identified—such as by the cluster matching engine 155 as described in FIG. 1, etc.—based on an evaluation of second configuration data for a second set of computing systems from the configuration data—such as members of the second computing cluster 125 as described in FIG. 1, etc.

At operation 520, a score may be calculated—such as by the score calculator 150 in conjunction with the artificial intelligence processor 165 as described in FIG. 1, etc.—for the second computing cluster based on an evaluation of the second configuration data using the first configuration data.

In an example, an artificial intelligence processor—such as the artificial intelligence processor 165 as described in FIG. 1, etc.—may be trained using training configuration data to generate a configuration matching model. The configuration matching model may include matching rules for applications corresponding to components executing on the plurality of computing systems and the matching rules may include weights for configuration variables for each of the components. The second configuration and the first configuration data as input to the artificial intelligence processor and the second configuration data and the first configuration data may be evaluated using the configuration matching model to calculate the score. The score may be based in part on the components identified in the second configuration data and weights for the configuration variables for the identified components.

At operation 525, the second computing cluster may be associated—such as by the cluster matching engine 155 as described in FIG. 1, etc.—with the first computing cluster based on the score. At operation 530, a standard configuration may be selected—such as by the standard selection agent 160 as described in FIG. 1, etc.—to be applied to the first set of computing systems and the second set of computing systems using the first configuration data.

In an example, an application executing on the first set of computing systems and the second set of computing systems may be identified based on first configuration and a configuration standard may be selected from a plurality of configuration standards based on the application. The configuration standard may include configuration variable values for components of the application. In an example, the standard configuration may be applied to instances of the application executing on the first set of computing systems and the second set of computing systems by updating, for the components of the application, configuration variable values for respective computing systems of the first set of computing systems and the second set of computing systems.

In another example, it may be determined that a configuration variable value for a configuration variable of a component of the application is uniform across the respective computing systems of the first set of computing systems and the second set of computing systems. Application of a standard configuration variable value to the configuration variable of the component of the application may be prevented and an exception notification may be transmitted to an administrator of the first set of computing systems and the second set of computing systems.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UTI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks, 3$^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for computing cluster standardization comprising:
    at least one processor; and
    memory including instructions that, when executed by the at least one processor, cause the at least one processor to perform operations to:
        obtain configuration data for a plurality of computing systems;
        identify a first computing cluster based on a first evaluation of first configuration data for a first set of computing systems of the plurality of computing systems from the configuration data;

identify a second computing cluster based on a second evaluation of second configuration data for a second set of computing systems from the configuration data;
calculate a score for the second computing cluster based on an evaluation of the second configuration data using the first configuration data;
associate the second computing cluster with the first computing cluster based on the score;
select a standard configuration to be applied to the first set of computing systems and the second set of computing systems using the first configuration data, the standard configuration selected from a standard configuration library;
identify a non-standard application associated with the standard configuration installed on the second set of computing systems, wherein the non-standard application is identified by generating a probability that the non-standard application and a standard application included in the standard configuration provide the same function, the probability generated by evaluating the standard configuration and the second configuration data using an artificial intelligence processor;
replace the non-standard application with the standard application, the standard application being a different application than the non-standard application;
convert a first configuration variable of the non-standard application to a variable for the standard application in the standard configuration;
identify that a second configuration variable of the non-standard application violates a standard configuration variable setting; and
upon receipt of a remediation action for the second configuration variable, apply the standard configuration and the remediation action to the first set of computing systems and the second set of computing systems.

2. The system of claim 1, the instructions to obtain the configuration data for the plurality of computing systems further comprising instructions to:
scan the plurality of computing systems to obtain respective configuration data for each computing system of the plurality of computing systems, wherein the configuration data includes identification of components executing on each computing system and configuration variables for each of the components executing on each of the computing systems.

3. The system of claim 2, the instructions to identify the first computing cluster further comprising instructions that cause the at least one processor to perform operations to:
obtain configuration data for a first computing system of the first set of computing systems;
calculate a score for a second computing system of the plurality of computing systems based on an evaluation of configuration variables for components executing on the second computing system against configuration variables for components executing on the first computing system; and
add the second computing system to the first set of computing systems based on the score.

4. The system of claim 3, the memory further comprising instructions to:
train an artificial intelligence processor using training configuration data to generate a configuration matching model, wherein the configuration matching model includes matching rules for applications corresponding to components executing on the plurality of computing systems, wherein the matching rules include weights for configuration variables for each of the components; and
the instructions to calculate the score for the second computing cluster further comprising instructions that cause the at least one processor to perform operations to:
receive the second configuration and the first configuration data as input to the artificial intelligence processor; and
evaluate the second configuration data and the first configuration data using the configuration matching model to calculate the score, wherein the score is based in part on the components identified in the second configuration data and weights for the configuration variables for the identified components.

5. The system of claim 1, the instructions to select the standard configuration to be applied to the first set of computing systems and the second set of computing systems using the first configuration data further comprising instructions that cause the at least one processor to perform operations to:
identify an application executing on the first set of computing systems and the second set of computing systems based on first configuration data; and
select a configuration standard from a plurality of configuration standards based on the application, wherein the configuration standard includes configuration variable values for components of the application.

6. The system of claim 5, the memory further comprising instructions that cause the at least one processor to perform operations to:
apply the standard configuration to instances of the application executing on the first set of computing systems and the second set of computing systems by updating, for the components of the application, configuration variable values for respective computing systems of the first set of computing systems and the second set of computing systems.

7. The system of claim 1, the memory further comprising instructions that cause the at least one processor to perform operations to:
determine that a configuration variable value for a configuration variable of a component of the application is uniform across the respective computing systems of the first set of computing systems and the second set of computing systems;
prevent application of a standard configuration variable value to the configuration variable of the component of the application; and
transmit an exception notification to an administrator of the first set of computing systems and the second set of computing systems.

8. At least one non-transitory machine-readable medium including instructions for computing cluster standardization that, when executed by at least one processor, cause the at least one processor to perform operations to:
obtain configuration data for a plurality of computing systems;
identify a first computing cluster based on a first evaluation of first configuration data for a first set of computing systems from the configuration data;
identify a second computing cluster based on a second evaluation of second configuration data for a second set of computing systems from the configuration data;

calculate a score for the second computing cluster based on an evaluation of the second configuration data using the first configuration data;
associate the second computing cluster with the first computing cluster based on the score;
select a standard configuration to be applied to the first set of computing systems and the second set of computing systems using the first configuration data, the standard configuration selected from a standard configuration library;
identify a non-standard application associated with the standard configuration installed on the second set of computing systems, wherein the non-standard application is identified by generating a probability that the non-standard application and a standard application included in the standard configuration provide the same function, the probability generated by evaluating the standard configuration and the second configuration data using an artificial intelligence processor;
replace the non-standard application with the standard application, the standard application being a different application than the non-standard application;
convert a first configuration variable of the non-standard application to a variable for the standard application in the standard configuration;
identify that a second configuration variable of the non-standard application violates a standard configuration variable setting; and
upon receipt of a remediation action for the second configuration variable, apply the standard configuration and the remediation action to the first set of computing systems and the second set of computing systems.

9. The at least one non-transitory machine-readable medium of claim 8, the instructions to obtain the configuration data for the plurality of computing systems further comprising instructions to:
scan the plurality of computing systems to obtain respective configuration data for each computing system of the plurality of computing systems, wherein the configuration data includes identification of components executing on each computing system and configuration variables for each of the components executing on each of the computing systems.

10. The at least one non-transitory machine-readable medium of claim 9, the instructions to identify the first computing cluster further comprising instructions that cause the at least one processor to perform operations to:
obtain configuration data for a first computing system of the first set of computing systems;
calculate a score for a second computing system of the plurality of computing systems based on an evaluation of configuration variables for components executing on the second computing system against configuration variables for components executing on the first computing system; and
add the second computing system to the first set of computing systems based on the score.

11. The at least one non-transitory machine-readable medium of claim 10, further comprising instructions to:
train an artificial intelligence processor using training configuration data to generate a configuration matching model, wherein the configuration matching model includes matching rules for applications corresponding to components executing on the plurality of computing systems, wherein the matching rules include weights for configuration variables for each of the components; and the instructions to calculate the score for the second computing cluster further comprising instructions that cause the at least one processor to perform operations to:
receive the second configuration and the first configuration data as input to the artificial intelligence processor; and
evaluate the second configuration data and the first configuration data using the configuration matching model to calculate the score, wherein the score is based in part on the components identified in the second configuration data and weights for the configuration variables for the identified components.

12. The at least one non-transitory machine-readable medium of claim 8, the instructions to select the standard configuration to be applied to the first set of computing systems and the second set of computing systems using the first configuration data further comprising instructions that cause the at least one processor to perform operations to:
identify an application executing on the first set of computing systems and the second set of computing systems based on first configuration data; and
select a configuration standard from a plurality of configuration standards based on the application, wherein the configuration standard includes configuration variable values for components of the application.

13. The at least one non-transitory machine-readable medium of claim 12, further comprising instructions that cause the at least one processor to perform operations to:
apply the standard configuration to instances of the application executing on the first set of computing systems and the second set of computing systems by updating, for the components of the application, configuration variable values for respective computing systems of the first set of computing systems and the second set of computing systems.

14. The at least one non-transitory machine-readable medium of claim 8, further comprising instructions that cause the at least one processor to perform operations to:
determine that a configuration variable value for a configuration variable of a component of the application is uniform across the respective computing systems of the first set of computing systems and the second set of computing systems;
prevent application of a standard configuration variable value to the configuration variable of the component of the application; and
transmit an exception notification to an administrator of the first set of computing systems and the second set of computing systems.

15. A method for computing cluster standardization comprising:
obtaining configuration data for a plurality of computing systems;
identifying a first computing cluster based on a first evaluation of first configuration data for a first set of computing systems from the configuration data;
identifying a second computing cluster based on a second evaluation of second configuration data for a second set of computing systems from the configuration data;
calculating a score for the second computing cluster based on an evaluation of the second configuration data using the first configuration data;
associating the second computing cluster with the first computing cluster based on the score;
selecting a standard configuration to be applied to the first set of computing systems and the second set of computing systems using the first configuration data, the standard configuration selected from a standard configuration library;

identifying a non-standard application associated with the standard configuration installed on the second set of computing systems, wherein the non-standard application is identified by generating a probability that the non-standard application and a standard application included in the standard configuration provide the same function, the probability generated by evaluating the standard configuration and the second configuration data using an artificial intelligence processor;

replacing the non-standard application with the standard application, the standard application being a different application than the non-standard application;

converting configuration variables of the non-standard application to variable for the standard application in the standard configuration;

identifying that a configuration variable of the non-standard application violates a standard configuration variable setting; and upon receipt of a remediation action for the second configuration variable, applying the standard configuration and the remediation action to the first set of computing systems and the second set of computing systems.

16. The method of claim 15, wherein obtaining the configuration data for the plurality of computing systems further comprises:

scanning the plurality of computing systems to obtain respective configuration data for each computing system of the plurality of computing systems, wherein the configuration data includes identification of components executing on each computing system and configuration variables for each of the components executing on each of the computing systems.

17. The method of claim 16, wherein identifying the first computing cluster further comprises:

obtaining configuration data for a first computing system of the first set of computing systems;

calculating a score for a second computing system of the plurality of computing systems based on an evaluation of configuration variables for components executing on the second computing system against configuration variables for components executing on the first computing system; and adding the second computing system to the first set of computing systems based on the score.

18. The method of claim 17, further comprising:

training an artificial intelligence processor using training configuration data to generate a configuration matching model, wherein the configuration matching model includes matching rules for applications corresponding to components executing on the plurality of computing systems, wherein the matching rules include weights for configuration variables for each of the components; and wherein calculating the score for the second computing cluster further comprises:

receiving the second configuration and the first configuration data as input to the artificial intelligence processor; and evaluating the second configuration data and the first configuration data using the configuration matching model to calculate the score, wherein the score is based in part on the components identified in the second configuration data and weights for the configuration variables for the identified components.

19. The method of claim 15, wherein selecting the standard configuration to be applied to the first set of computing systems and the second set of computing systems using the first configuration data further comprises:

identifying an application executing on the first set of computing systems and the second set of computing systems based on first configuration data; and selecting a configuration standard from a plurality of configuration standards based on the application, wherein the configuration standard includes configuration variable values for components of the application.

20. The method of claim 19, further comprising:

applying the standard configuration to instances of the application executing on the first set of computing systems and the second set of computing systems by updating, for the components of the application, configuration variable values for respective computing systems of the first set of computing systems and the second set of computing systems.

21. The method of claim 15, further comprising:

determining that a configuration variable value for a configuration variable of a component of the application is uniform across the respective computing systems of the first set of computing systems and the second set of computing systems;

preventing application of a standard configuration variable value to the configuration variable of the component of the application; and transmitting an exception notification to an administrator of the first set of computing systems and the second set of computing systems.

* * * * *